Feb. 1, 1955            J. H. TAYLOR            2,700,958
TETHER FOR BULLS AND OTHER LIVESTOCK
Filed March 10, 1953                          3 Sheets-Sheet 1
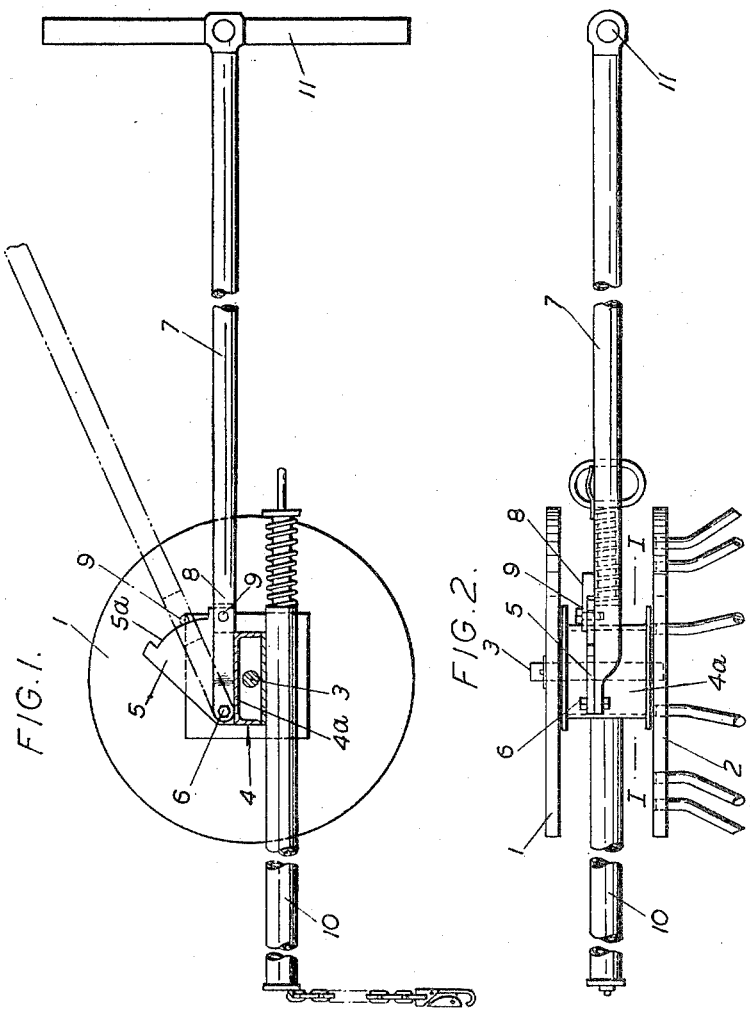
Inventor
John Harding Taylor
By
Alexander Dowell
Attorneys

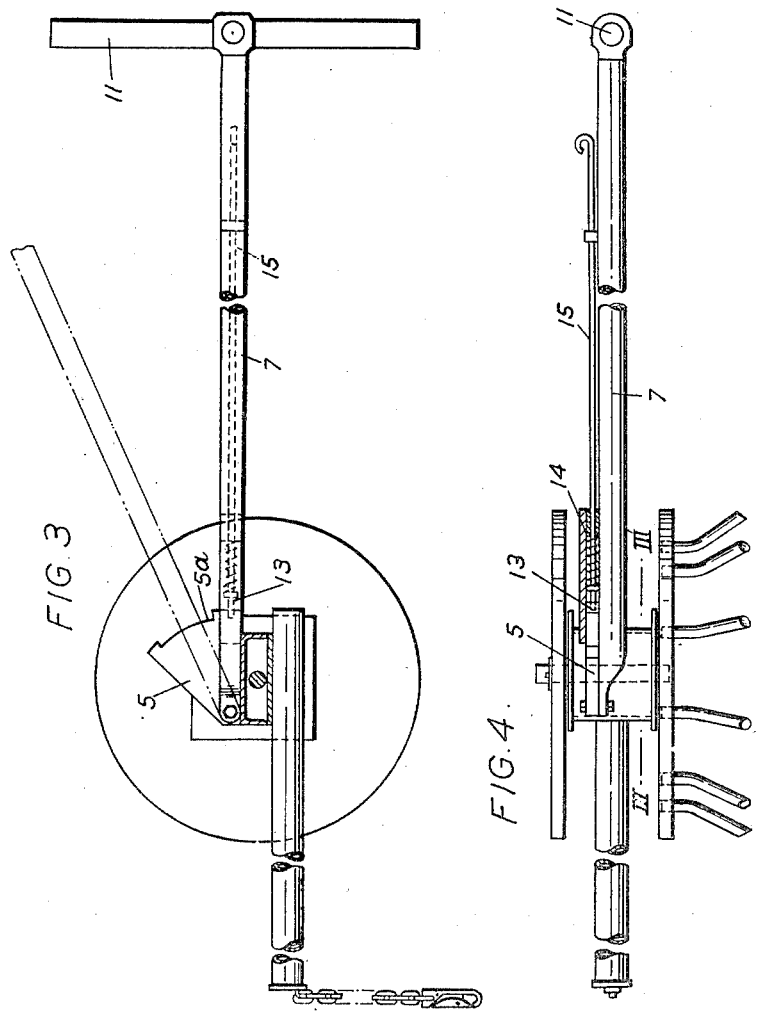

Feb. 1, 1955   J. H. TAYLOR   2,700,958
TETHER FOR BULLS AND OTHER LIVESTOCK
Filed March 10, 1953   3 Sheets-Sheet 3
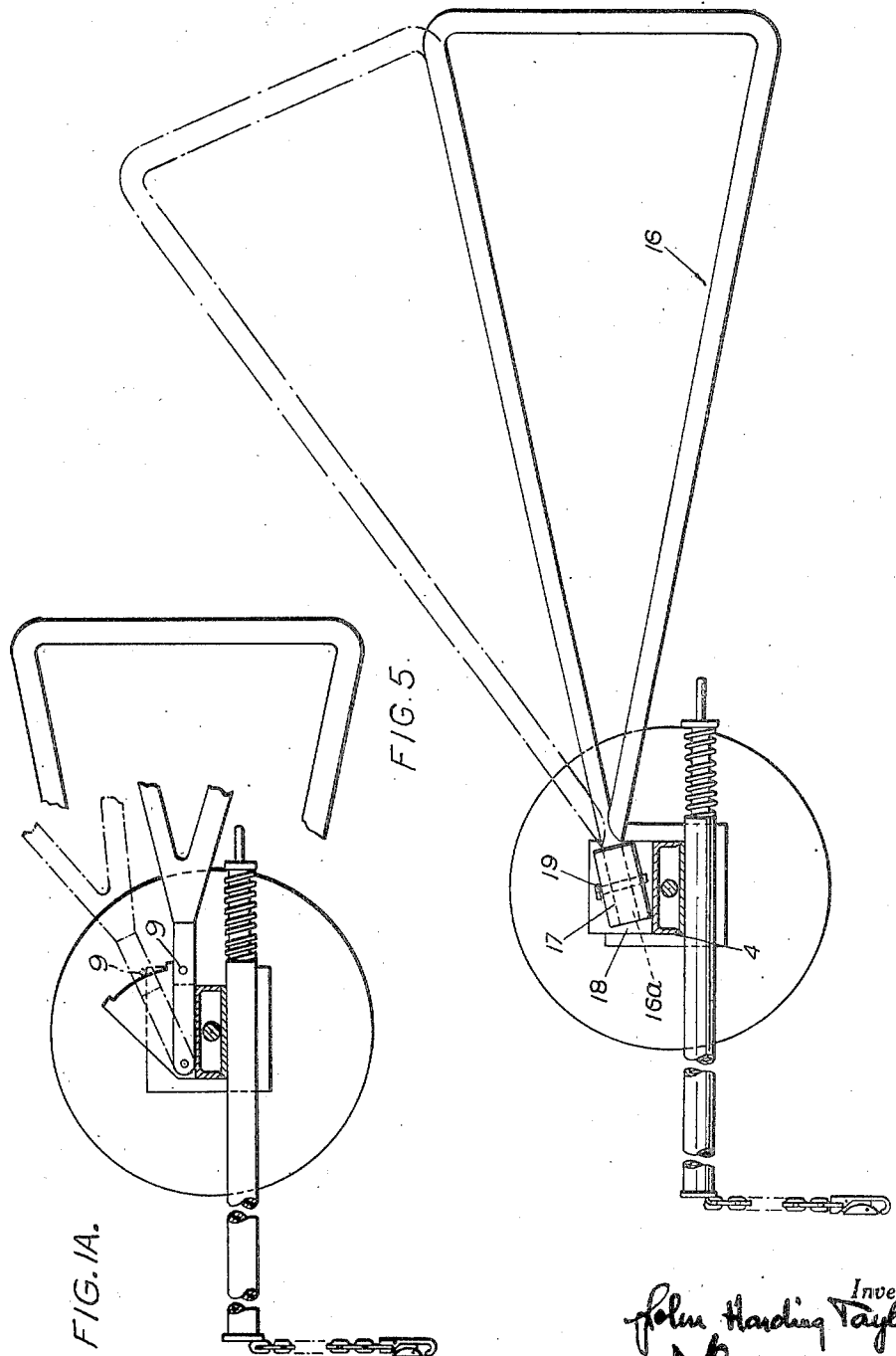

United States Patent Office 2,700,958
Patented Feb. 1, 1955

2,700,958
TETHER FOR BULLS AND OTHER LIVESTOCK

John Harding Taylor, Bunker Hill, Medomsley, England

Application March 10, 1953, Serial No. 341,521

Claims priority, application Great Britain November 7, 1952

5 Claims. (Cl. 119—109)

This invention relates to tethers for bulls and other livestock of the kind comprising circular disc means, an axle projecting normally from said disc means, an axle box rotatably mounted about said axle, a tethering rod mounted on said axle box, a plurality of spikes projecting from the side of the disc means remote from the tethering pole, a push rod mounted on said axle box so as to project from the side of said axle box opposite to that from which said tethering rod projects. Such a tether is described in the specification of my British Patent No. 623,260.

It has been found that with the above tether, a bull occasionally discovers that he can lift the angled handle and tip the tether into the wheeling position, so that he can drag the tether about with him, thus defeating the object of the tether. It is the object of the present invention to provide means which obviate this drawback, and supply a tether which it will be impossible for an animal to tip from the tethering position into the wheeling position.

According to the invention the push rod is provided with a cross piece projecting from both sides of the outer end of the axis of the said push rod, which cross piece lies horizontal when the tether is in the tethering position, so that in the event of the tether being tilted at all, after a relatively small amount of movement the ends of the cross piece contact the ground and prevent further movement.

The invention will now be described by way of example with reference to the accompanying drawings.

In the said drawings:

Fig. 1 is a section on the line I—I of Fig. 2 and shows the tether in the wheeling position.

Fig. 1A shows a modified form of Fig. 1.

Fig. 2 shows the tether of Fig. 1 turned through 90° into the tethering position.

Fig. 3 is a section on the line III—III of Fig. 4 showing an alternative mounting of the handle.

Fig. 4 shows the tether of Fig. 3 turned through 90° into the tethering position.

Fig. 5 is a plan showing a further form of handle mounting with the tether turned into the tethering position.

Referring more particularly to Figs. 1 and 2 of the drawings, 1, 2 are the discs of the tether. 2a are the spikes projecting from the side of the disc 2 remote from the tethering rod hereinafter referred to. 3 is the axle and 4 the axle box. 5 is a quadrant which is welded to the web of the channel portion 4a of the axle box, so that the axle lies at about half way along the side of the quadrant.

Pivotally mounted at the centre 6 of the quadrant is the push rod 7, while located along the push rod 7 so as to project over the segmental edge of the quadrant 5 is a guide plate 8 in which a drop-in locating bolt or pin 9 whose end is adapted to pass into a corresponding hole near the inner edge of the quadrant 5 and adjacent the inner end of the tethering rod or bull stick tube 10 which is secured to the axle box 4 on the side remote from the push rod 7, so that when the push rod is swung into the position in which it is practically in alignment with the tethering rod, the two holes coincide and the pin 9 will pass into the quadrant hole to hold the push rod 7 in this position. The segmental edge of the quadrant has a relatively long notch 5a for accommodating the pin 9 when the tether is to be wheeled to the tethering site.

A cross bar 11 is provided at the outer end of the push rod 7 and lies in a plane parallel to those of the discs.

With this arrangement, when the bull, for example, is to be tethered, the push rod 7 is swung out of alignment with the tethering rod 10 until the guide plate 8 projects over the notch 5a in the quadrant, and the drop-in pin 9 made to engage with the notch. The tether may now be wheeled to the tethering ground. On arrival at the desired tethering site the attendant exerts a twist through the cross bar 11 and tilts the discs 1, 2 into the tethering position. He then lifts out the drop-in pin 9, swings the push rod 7 to the inner position of substantial alignment with the tethering rod 10, and replaces the drop-in pin 9 so that the push rod is once more locked, but in the position in which it cannot be used to lever the discs out of the tethering position into the wheeling position, the cross bar 11 further ensuring against this.

The push rod may take the form of a triangular frame 12 whose apex contains the pivotal axis of the push rod, the locking means being arranged so that in the tethering position the axis of the triangular frame lies substantially in alignment with the tethering rod, as shown in Fig. 1A.

According to a modification of the above form shown in Figs. 3 and 4, instead of a drop-in pin 9 for engaging the quadrant 5, a spring pressed bolt or plunger 13 is arranged along the push rod in guide means 14 to engage a notch near the inner end of the segmental edge of the quadrant 5, and the wider notch 5a, a pull rod 15 being connected to the plunger and terminating near the cross bar. This construction enables the locking and unlocking of the push rod 7 to be carried out without the operator's having to let go of the cross bar 11.

Fig. 5 shows a further modification according to which the handle is of triangular form 16, the one leg of which is extended beyond the apex as at 16a for rotatably mounting in an obliquely arranged socket 17 mounted on a plate 18 welded at right angles to the web of the axle box 4. Diametral holes are formed in the socket 17 to receive a drop-in pin 19 which, when the push rod is in either of the positions shown—parallel to the planes of the discs—passes through a transverse bore in the extension 16a to maintain it locked in that position. With this form the push rod is turned to the upper position shown in chain line in Fig. 5 and the pin 19 dropped into position; and in this position the tether may be wheeled to the tethering site. When the tethering site has been reached, the pin 19 is disengaged, the push rod turned through 180° and the pin 19 reengaged. In this position the axis of the push rod is only slightly offset from that of the tethering rod, and the base of the triangle resists any attempt at axial tilting.

I claim:

1. An improved tether for bulls and other livestock, comprising circular disc means, an axle projecting normally from said disc means, an axle box rotatably mounted about said axle, a tethering rod mounted on said axle box, a plurality of spikes projecting from the side of the disc means remote from the tethering rod, a push rod mounted on said axle box so as to project from the side of said axle box opposite to that from which said tethering rod projects, said push rod being pivotally mounted relatively to the tethering rod, means for locking the push rod substantially in alignment with the tethering rod, and a cross piece projecting from both sides of the outer end of the axis of the push rod, said cross piece being arranged relatively to the push rod so that when the tether is in the tethering position it lies horizontal.

2. A tether according to claim 1 wherein the push rod is in the form of a triangular frame whose apex is adjacent to the pivotal axis of the push rod, the push rod being arranged so that in the tethered position the axis of the triangular frame lies substantially in alignment with the tethering rod.

3. A tether according to claim 1, a quadrant on the axle parallel with the disc means, the push rod being pivotally mounted about the centre of said quadrant, means for locking the push rod with the quadrant so that said push rod lies substantially in alignment with the tethering rod, said quadrant having a wide notch along its segmental edge for engagement by said locking means when the tether has to be moved.

4. A tether according to claim 1, a quadrant on the axle parallel with the disc means, the push rod being pivotally mounted about the centre of said quadrant, a spring pressed bolt for locking the push rod with the quadrant so that said push rod lies substantially in alignment with the tethering rod, said quadrant having a wide notch along its segmental edge for engagement by said locking bolt when the tether has to be moved, and a pull rod slidably mounted on the push rod for operating said bolt.

5. A tether according to claim 1 wherein the handle is in the form of a triangular frame whose apex contains the pivotal axis of the push rod, the locking means being arranged so that in the tethered position the axis of the triangular frame lies substantially in alignment with the tethering rod, an obliquely arranged socket on the axle box, one leg of said triangular frame being extended beyond the apex of the triangle for rotary engagement with said socket, and means for locking said frame in said socket in either of two positions in which it lies parallel with the disc means.

References Cited in the file of this patent

UNITED STATES PATENTS

| | | |
|---|---|---|
| 876,328 | Chamberlin | Jan. 14, 1908 |

FOREIGN PATENTS

| | | |
|---|---|---|
| 623,260 | Great Britain | May 13, 1949 |